June 25, 1963 O. ROELEN ETAL 3,095,451
CATALYTIC ADDITION OF CARBON MONOXIDE AND
HYDROGEN TO OLEFINIC COMPOUNDS
Filed Dec. 13, 1957

INVENTORS:
OTTO ROELEN, KARL BÜCHNER, JOSEF MEIS

ATTORNEYS

United States Patent Office 3,095,451
Patented June 25, 1963

3,095,451
CATALYTIC ADDITION OF CARBON MONOXIDE AND HYDROGEN TO OLEFINIC COMPOUNDS
Otto Roelen, Oberhausen-Holten, Karl Büchner, Oberhausen-Sterkrade, and Josef Meis, Oberhausen-Osterfeld, Germany, assignors to Ruhrchemie Aktiengesellschaft, Oberhausen-Holten, Germany, a corporation of Germany
Filed Dec. 13, 1957, Ser. No. 702,636
Claims priority, application Germany Dec. 18, 1956
5 Claims. (Cl. 260—598)

This invention relates to new and useful improvements in the catalytic addition of carbon monoxide and hydrogen to olefinic compounds.

The catalytic addition of carbon monoxide and hydrogen such as in the form of water-gas to olefinic compounds in accordance with the oxo-synthesis, is well known. Of the various catalysts which are known for the oxo process aqueous metal salt solutions and particularly those which will supply cobalt carbonyl hydride such as aqueous cobalt salt solutions are preferred.

The oxo process is generally effected by contacting the carbon monoxide hydrogen containing gas with the olefinic starting material, in the presence of a catalyst under reaction conditions of elevated temperature and pressure. The catalyst, as, for example, in the form of the aqueous metal salt solution, may be intimately mixed by stirring with the olefinic starting material in order to produce the active carbonyl compounds. It has also been proposed to load the carbon monoxide and hydrogen-containing gas with the carbonyl compounds such as the cobalt carbonyl compounds prior to their passage into the reaction chamber.

Figure 1:
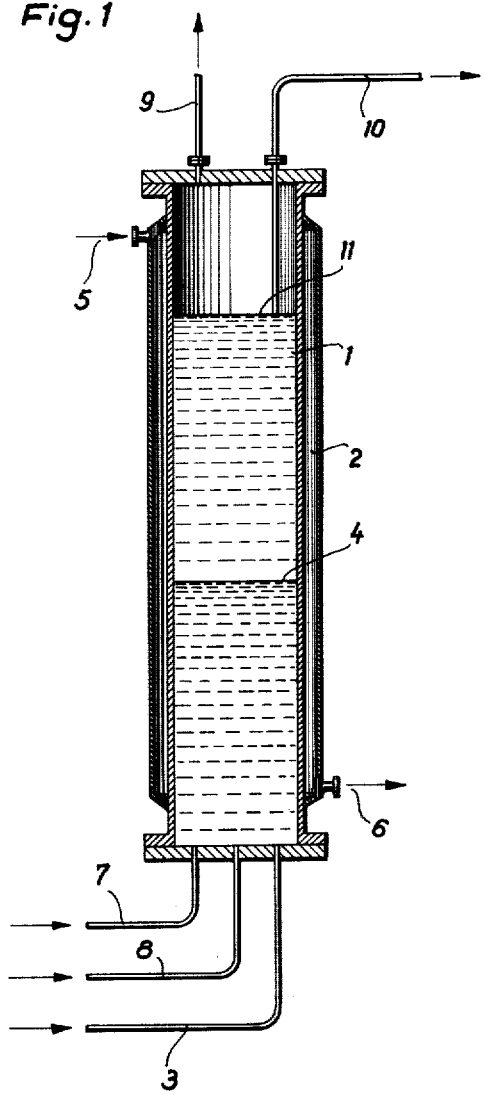
Figure 2:
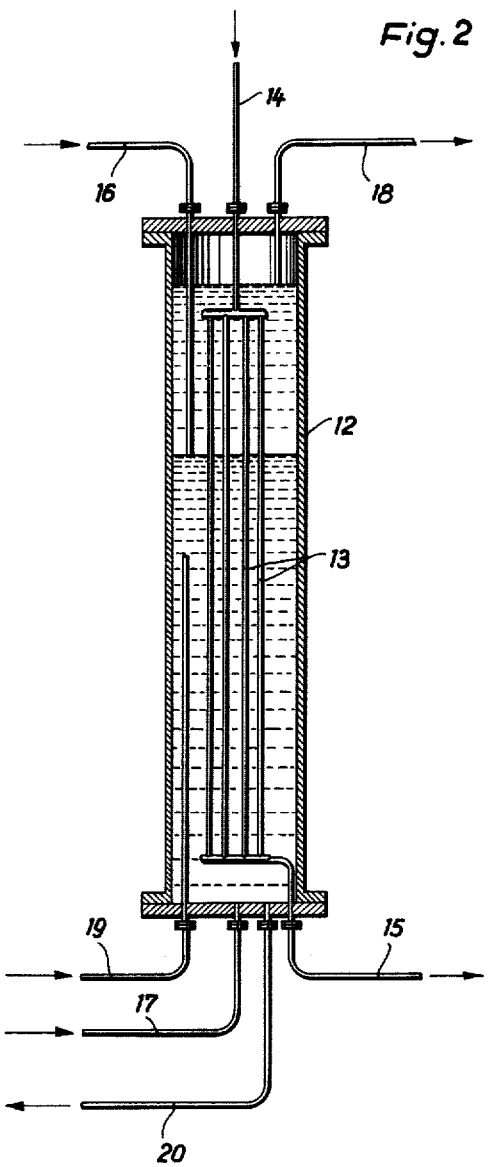
Figure 3:
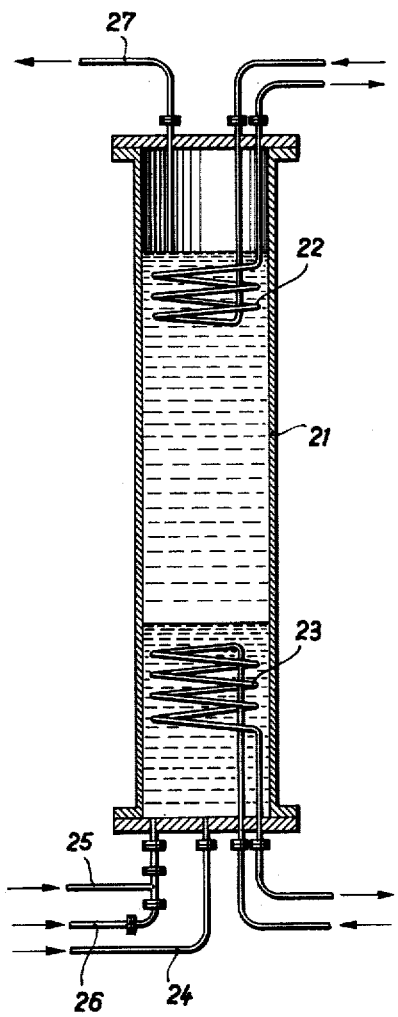

One object of this invention is a novel method for effecting the oxo-synthesis which produces an extremely high conversion, high space-time yield and allows continuous operation with the use of a very simple and foolproof apparatus. These, and still further objects will become apparent from the following description, read in conjunction with the drawings, in which;

FIG. 1 is a diagrammatic vertical section showing an embodiment of an apparatus for effecting the process, in accordance with the invention, FIG. 2 is a diagrammatic vertical section of a still further embodiment of an apparatus for effecting the process, in accordance with the invention, and FIG. 3 is a diagrammatic vertical section of a still further embodiment of an apparatus for effecting the process, in accordance with the invention.

The invention relates to the process for the addition of carbon monoxide and hydrogen to olefinic compounds in accordance with the oxo-synthesis, in which a carbon monoxide and hydrogen containing gas is contacted with an olefinic compound under reaction conditions of elevated temperature and pressure, in the presence of an oxo catalyst, comprising an aqueous metal salt solution. In accordance with the improvement of the invention, a substantially vertically extending reaction zone is established, and a two phase system is maintained in the reaction zone. The two phase system comprises a lower phase of the aqueous metal salt solution and super-adjacent upper oily phase of the reaction product. The carbon monoxide hydrogen containing gas is passed upwardly, though the lower aqueous phase, and through the interphase between the upper and lower phases, and the contacting with the olefinic compound is effected in the upper oily phase.

When operating in accordance with the invention, the carbon monoxide hydrogen containing gas first flows through the aqueous metal salt solution, loading itself therein with the active carbonyl compounds and then passes on in an upward direction through the oily layer where the same reacts with the olefin. In this reaction, the two liquid phases remain for the major part, intact, and a mechanical mixing of the two phases only takes place at the interphase and to the degree to which the liquid is entrained by the gas.

The starting carbon monoxide hydrogen containing gas may be any of the known conventional carbon monoxide hydrogen containing gases, such as water-gas, used for the oxo-synthesis. The ratio of hydrogen to carbon monoxide in the gas used may range between 1:4 and 4:1, best results having been obtained with a ratio of 1:1 to 1:2.

The starting olefinic compound may be any of the conventional unsaturated compounds used for the oxo-synthesis such as olefins or compounds containing one or more olefinic bonds. Olefinic compounds which are suitable for the reaction include monoolefins, primary olefins, cracked olefins, polymeric olefins, and cyclic diolefins.

The aqueous metal salt solutions used as the catalyst may be any of the conventional aqueous metal salt solutions used as oxo-synthesis catalysts and are preferably aqueous cobalt salt solutions. In place of aqueous cobalt salt solutions, however, other aqueous metal salt solutions may be used, as, for example, aqueous solutions of cobalt sulfate and iron sulfate, and of cobalt sulfate and magnesium sulfate and iron sulfate. The concentration of cobalt in the solutions used may range between 8 and 25 gms./liter of Co and is preferably about 16 grams/liter of Co. The amounts of catalyst required for the reaction vary depending upon the type of starting material used for the reaction and upon the reaction conditions used. In general, about 1 volume of catalyst solution will be used for 1 volume of olefin to be reacted, however, the ratio may vary depending upon the manner of carrying out the reaction. A pH value between 3.0 and 5.5 and especially between 3.5 and 4 is preferred for the cobalt salt solutions.

The other reaction conditions are the same as those conventionally used in the oxo-synthesis. For simple olefins, a temperature of 150–160° C. and a pressure of between 150 and 250 kg./sq.cm. and preferably up to 200 kg./sq.cm. will be sufficient. For diolefins and the dioxonation thereof somewhat more severe conditions will be used, i.e. a temperature of between 160 and 180° C. and a pressure of between 200 and 300 kg./sq.cm. and preferably of 240–160 kg./sq.cm.

Actually, the interaction between the simultaneously present phases probably proceeds in a substantially more complicated manner than would appear from the above, since the conversions obtainable, in accordance with the invention, are surprisingly high. In accordance with the invention, nearly complete conversions of the olefin are obtainable in a single stage with continuous gas passage. It is also possible, however, to operate in several stages, and to obtain only partial conversions in the known manner in two or several series connected reaction vessels filled with the super-adjacent layers of the suitable metal salt solutions and the reaction products.

The olefinic compounds to be processed may be introduced into the reaction vessel at the bottom of the aqueous solution, together with the carbon monoxide and hydrogen containing gas or may be introduced into the reaction chamber separately into the aqueous phase or separately into the oily phase, particularly in the lower portion of the oily phase.

The depth of the oily phase is preferably so chosen, that at least the upper part thereof remains free from any substantial amounts of the aqueous phase which, as the case may be, are entrained by the gas stream passing in the upward direction. The reaction products may thus be withdrawn, as, for example, continuously from the upper part of the oily phase, and remain substantially free from entrained aqueous solution.

In order to obtain favorable space-time yields, the relative volumes of the two phases should be maintained substantially constant, and preferably have volume ratios between 1:4 and 4:1, and of preferably about equal volumes.

The gas stream continuously entrains water and volatile metal compounds from the aqueous phase. The oily phase flowing off likewise contains small amounts of dissolved portions of the aqueous phase. To maintain steady operating conditions, the aqueous phase, in accordance with the invention, is continuously and/or batchwise renewed in such a manner that its volume and composition remains constant. This may be achieved, for example, by continuously adding small amounts of an aqueous salt solution of suitable concentration, which are just sufficient to make up for losses due to withdrawal.

If, in accordance with the process of German Patent 888,098, the process is operated with cobalt salt solutions in the presence of iron, the aqueous phase gradually loads itself with dissolved iron compounds. Too high an increase in iron content can be avoided by withdrawing appropriate amounts of the aqueous phase and introducing further amounts of aqueous salt solution in addition to those making up for the losses due to withdrawal. The quantities of solution withdrawn are regenerated, i.e., freed as far as possible from their iron content and supplemented as required with regard to the other constitutents of the solution. The withdrawal and make-up may be effected continuously or may be effected batchwise in larger amounts after extended periods of operation.

The removal of the evolving heat of reaction and the control of the reaction temperature are effected in known manner by means of suitable heat exchange surfaces. The reaction tube may, for example, be surrounded by an external jacket through which heat-controlling media, as, for example, water under pressure or non-aqueous heat transferring agents are passed. The reaction chamber may also be provided in its interior with heating or cooling members in form of, for example, tubular coils through which the heat-controlling media flow.

As is known, the reaction velocities of olefinic compounds in the catalytic addition of water gas are different depending upon their molecular size and structure. Depending upon the type of olefin being processed, it may be of advantage, therefore, to maintain the temperature at a uniform level throughout the reaction space or to maintain it at different levels in the two liquid phases. It is also possible to have the temperature in the two liquid layers increase in upward direction, in which case the formation of volatile metal compounds occurs in the aqueous phase which is maintained at a lower temperature, as, for example, within a range of temperatures of between 110 and 150° C., while the catalytic addition of carbon monoxide hydrogen gas to the olefin takes place in the super-jacent oily layer at higher temperatures, as for example, at 160–180° C.

The process of the invention may be carried out with olefins admixed, if necessary or desired, with inert auxiliary liquids in known manner.

The advantages of the process of the invention consist in that it is very simple with regard to the apparatus and from the process engineering point of view, that it gives high spacetime yields based on the total high pressure space required, and, in continuous operation, permits the use of aqueous salt solutions which have a very favorable effect.

Further details of the process may be seen from the following examples in which reference is made to the appended drawings.

Example 1

A total of 60 liters of aqueous cobalt sulfate solution having a pH value of 3.5 and containing 16 grams of cobalt per liter was filled through line 3 (FIG. 1) into a vertical high pressure vessel 2 having a capacity of 180 liters and equipped with a heat exchange jacket 1, the level of said solution being at 4. The line 3 was also used for making up the cobalt sulfate solution. On top of this solution was placed a layer comprising 60 liters of a raw aldehyde having a molecular size of $C_9/C_{10}$ and prepared in batch operation from $C_8/C_9$ cracked olefins.

After having applied a water gas pressure of 170 kg./cm.² to the reactor 2, the contents of the reactor was heated to about 170° C., by introducing steam of 18 kg./sq.cm. into the heating jacket 1. The heating steam was admitted at 5 and the condensate was withdrawn at 6. During the heating, the gas pressure in the reactor increased to the operating pressure desired of about 250 kg./sq.cm. Upon having reached the operating temperature of 170° C., the injection of the olefinic hydrocarbon at the bottom of the reactor was started.

The $C_8/C_9$ cracked olefin used had the following characteristics:

Density at 20° C. _____ 0.736
Refractive index, $n_D^{20}$ _____ 1.4190
Iodine number _____ 193
Molecular weight _____ 120

The olefin in a uniform stream, was introduced through line 7 at the bottom of the reactor by means of a high-pressure reciprocating pump at a rate of 30 liters/hr. Together with the olefin, sufficient water gas was forced in through line 8 at the bottom of the reactor that the pressure in the reactor 2 was about 250 kg./sq.cm. with the tail gas flowing off through line 9 at a rate of 6 normal cu.m./hr. The amount of water gas required was about 14 normal cu.m./hr. The raw aldehyde formed by the addition of water gas was continuously withdrawn from the surface 11 of the oily phase through a discharge line 10, whereby further amounts of tail gas of 1.5–2 normal cu.m./hr. were obtained.

After having started the introduction of olefin, the heating steam of 18 kg./sq.cm. was shut off and steam of 2.5 kg./sq.cm. was introduced into the jacket space 2, which permitted the temperature to be maintained at a uniform level of 165–170° C.

The course of the reaction may be seen from the following table showing the analyses of average samples. The quantity of aldehyde placed in the reactor at the beginning still contained olefins in amount corresponding to an iodine number of 12, i.e., 92.6% by weight of the olefins had been converted.

| Average sample taken after— hours | Iodine Number | Olefin conversion, percent by weight | Remarks |
|---|---|---|---|
| 1 | 13 | 92 | |
| 2 | 11 | 93.2 | |
| 3 | 7 | 95.7 | |
| 4 | 8 | 95.1 | |
| 5 | 9 | 94.4 | |
| 6 | 11 | 93.2 | |
| 7 | 8 | 95.1 | |
| 8 | 7 | 95.7 | Addition of 5 liters of cobalt sulfate solution containing 16 gms./liter of cobalt. |
| 10 | 9 | 94.4 | |
| 12 | 8 | 95.1 | |
| 16 | 10 | 93.8 | Addition of further 5 liters of cobalt sulfate solution containing 16 gms./liter of cobalt. |
| 20 | 8 | 95.1 | |
| 24 | 9 | 94.4 | |

After 24 hours, a total of 720 liters of olefin had been put through. After cooling, the reactor 2 still contained 63 liters of a $C_9/C_{10}$ olefin mixture having an iodine number of 6 and 54 liters of aqueous cobalt sulfate solution containing 14.8 gms./liter of cobalt.

An average sample of the aldehyde produced was subjected to a treatment with water under pressure at 190° C., and hydrogenated in known manner at 180° C., with a cobalt-magnesia-kieselguhr catalyst. Upon separation of the catalyst, the hydrogenated product was distilled. The following products were obtained from 100 kg. of $C_{8/9}$ olefin:

96.2 kg. of $C_{9/10}$ alcohol
7.3 kg. of thick oil
12.8 kg. of $C_{8/9}$ paraffin in the oxonation step
5.1 kg. of $C_{8/9}$ paraffin in the hydrogenation step
0.6 kg. of unconverted residual olefin

*Example 2*

Use was made of the reaction vessel 12 shown in FIG. 2 equipped in its interior with heat exchange tubes 13. The heat exchange medium was introduced through line 14 while the condensate or the exchange medium used was led off through line 15. The heating agent used was steam of 18 kg./sq.cm., and the cooling agent was steam of 2.5 kg./sq.cm., which in addition, could be depressurized to atmospheric pressure. The change-over from heating steam to cooling steam and the additional depressurizing were controlled by the temperature in the reactor.

Diisobutylene at a rate of 30 liters/hr. was forced through the reactor after the latter had been brought to a temperature of 170° C., and a water gas pressure of 240 kg./sq.cm. The olefin was injected through a pipe 16, extending through the cover of the reactor and downwardly about half-way of the latter. The reactor contained 90 liters of cobalt sulfate solution of the composition given in Example 1 and 35 liters of raw i-$C_9$ aldehyde which had been prepared batchwise from diisobutylene by catalytic addition of water gas. The characteristics of this raw aldehyde were as follows:

| | |
|---|---|
| Iodine number | 34 |
| Neutralization number | 1.5 |
| Ester number | 5.0 |
| Hydroxyl number | 94 |
| Carbonyl number | 162 |

The reaction temperature and the water gas pressure in the reactor were maintained at constant levels of 170° C., and about 250 kg./sq.cm., respectively. The water gas was forced in through a nozzle 17 at the bottom. The quantity of tail gas was 7 normal cu.m./hr. during the first 4 hours of operation and thereafter about 3 normal cu.m./hr. The tail gas was withdrawn through line 18 together with the reaction product and was depressurized while being withdrawn.

Cobalt sulfate solution in amount of 2 liters per hour was introduced through line 19 at the bottom of the reactor 12 and 1.25 liters/hr. of cobalt sulfate solution were simultaneously withdrawn from the reactor through line 20.

The course of the reaction may be seen from the following table:

| Sample taken after—hours | Iodine Number | Olefin Conversion, Percent |
|---|---|---|
| 1 | 44 | 76.2 |
| 2 | 25 | 86.3 |
| 3 | 21 | 88.5 |
| 4 | 16 | 91.1 |
| 5 | 17 | 90.7 |
| 6 | 16 | 91.1 |
| 7 | 16 | 91.1 |
| 8 | 16 | 91.1 |
| 10 | 17 | 90.7 |
| 12 | 15 | 91.5 |
| 16 | 16 | 91.1 |
| 20 | 16 | 91.1 |
| 24 | 16 | 91.1 |

The test was discontinued after 24 hours. The reactor still contained 65 liters of aldehyde and 55 liters of aqueous solution containing 16.02 gms./liter of Co.

*Example 3*

Use was made of the pressure vessel 21 shown in FIG. 3, which was provided in its upper part with a tubular coil 22 and in its lower part with a tubular coil 23. Through these tubular coils, the particular heat exchange media desired were passed. The upper heating coil 22 could be controlled so as to switch over automatically to steam of 3.5 kg./sq.cm. after a temperature of 170° C. was reached. By means of the two tubular coils 22 and 23, the reactor was maintained during the test at about 140° C., in its lower part and at about 170° C. in its upper part.

The reactor was filled with 60 liters of a solution consisting of 50% by weight of a dioxonation product of dicyclopentadiene and 40% by weight of toluene as the solvent. The iodine number of this dialdehydic solution was 4 corresponding to a 97.8 conversion of the diolefin. 60 liters of the cobalt sulfate solution mentioned in Example 1 and containing 1 kg. of iron powder having a particle size of less than 0.06 mm. suspended therein were introduced through line 24, so as to form a separate layer beneath the toluene-aldehyde solution. After the reactor, through line 25, was brought to a water gas pressure of 250 kg./sq.cm. and a reaction temperature of 168° C. was reached, the injection of a solution of equal parts by volume of dicyclopentadiene and toluene was started maintaining the throughput at 30 liters/hr. This solution was introduced through line 26. About the same quantity of reaction product together with the tail was withdrawn from the reactor through line 27.

The dicyclopentadiene used as the starting material had the following characteristics:

| | |
|---|---|
| Density at 20° C | 0.981 |
| Refractive index, $n_D^{20}$ | 1.5115 |
| Ozone iodine number | 382 |
| Molecular weight | 131 |

The reaction mixture to be processed had a iodine number of 191.

The diolefinic starting solution was introduced at the bottom of the reactor together with the water gas. During the test, the water gas pressure in the reactor was maintained at about 250 kg./sq.cm. and the reaction temperature was maintained between 168 and 171° C. The quantity of tail gas was 7 normal cu.m./hr. and the throughput of olefin mixture was at a uniform rate of 30 liters/hr. The absorption of water gas was between 10 and 11 normal cu.m./hr. The course of the reaction remained completely uniform over 8 hours of test period with the diolefin conversion being 95.1% for all average samples taken hourly.

A sample showed the following conversion of dicyclopentadiene after the hydrating hydrogenation.

From 100 kg. of dicyclopentadiene was obtained:

95.9 kg. of tricyclodecane-dimethylol
17.4 kg. of tricyclodecane-methylol
4.6 kg. of cyclopentane-methylol
26.4 kg. of resinous residue.

*Example 4*

Into a pressure vessel of 3.4 liters capacity, 100 mm. diameter and 460 mm. length were placed 1 liter of cobalt sulfate solution containing 15 grams of Co per liter and 1.4 liters of aldehyde of diisobutylene having an iodine number of 6 corresponding to 96.6% by weight of olefin conversion and 10 grams of iron powder.

The reaction chamber was provided in its interior with a thermometer well and a feed nozzle for diisobutylene and water gas extending down to 20 mm. above the bottom. The discharge nozzle for the reaction product was located in the cover of the autoclave and extended only 120 mm. into the reaction chamber. The tail gas was withdrawn through a further nozzle provided in the cover of the chamber. Filling bodies or other gas-distributing internals were not provided in the reaction chamber.

The test was carried out under the following conditions:

Temperature_____155–160° C.
Water gas pressure_____230–250 kg./sq.cm.
Rate of tail gas_____75 liters/hr. corresponding to an excess of about 100%.
Rate of throughput_____300 and 250 cc./hr. respectively, of diisobutylene.
Test period_____37 hours.

During the first 17 hours, the throughput was 300 cc./hr. of diisobutylene. The conversion of olefin in this case was 87.0% on an average. In the following 20 hours of operation, 250 cc./hr. of diisobutylene were put through and 89.7% by weight of olefin were converted.

Total throughput of olefin was 10.1 liters which entrained 214 cc. of water corresponding to 2.12% by weight from the cobalt salt solution. The consumption of cobalt was 0.111% by weight.

The analysis of the tail gas showed a content of inerts of 22.3% by volume.

*Example 5*

Into the reaction vessel 12, shown in FIG. 2 were filled 50 liters of cobalt sulfate solution containing 16.4 grams/liter of Co and 16.1 grams/liter of Fe, and 70 liters of a raw aldehyde which had been prepared by hydroformylation of diisobutylene. Thereafter, at 170° C. and a water gas pressure of 240–250 kg./sq.cm., 4025 liters of diisobutylene were forced into the reactor 12 from below within 134 hours together with the water gas.

The spent cobalt sulfate solution was made up every 8 hours by injecting 6.1 liters of fresh solution. Moreover, after 50 hours and after 100 hours of reaction, 500 grams of iron powder having a particle size of less than 0.05 mm. and suspended in 2 liters of cobalt sulfate solution were forced into the reactor. The quantity of tail gas could be maintained between 4 and 6 normal cu.m./hr.

The final product obtained comprised 4080 liters of hydroformylated diisobutylene in which 91.8% by weight of the olefin was converted. The metal content of this product was 0.076 gram/liter of Co and 0.171 gram/liter of Fe. The quantity of cobalt solution injected to make up for the spent solution was 102 liters. The consumption of cobalt was 0.058% by weight. The quantity of water discharged with the product was 3.9% by weight based on olefin charged.

We claim:

1. In the process for the addition of carbon monoxide and hydrogen to olefinic compounds, in accordance with the oxo-synthesis in which a carbon monoxide and hydrogen containing gas is contacted with an olefinic compound under reaction conditions of elevated temperature and pressure in the presence of an oxo-catalyst comprising an aqueous metal salt solution, the improvement which comprises establishing a substantially vertically extending reaction zone, maintaining a liquid-liquid two phase system in said reaction zone, comprising a lower phase of said aqueous metal salt solution, and a super-adjacent upper oily phase of reaction product, passing said carbon monoxide hydrogen containing gas upwardly through said lower phase, the inter-phase between said phases, and thereafter through said upper oily phase and effecting said contacting with said olefinic compound in said upper phase the two phases remaining substantially intact during the passing therethrough of the said carbon monoxide hydrogen containing gas.

2. Improvement, according to claim 1, in which said aqueous metal salt solution is an aqueous cobalt salt solution.

3. Improvement, according to claim 1, in which the aldehydic reaction product formed is substantially continuously withdrawn from the upper portion of said upper phase substantially free from said aqueous phase.

4. Improvement, according to claim 1, in which said phases have a volume ratio between 1:4 and 4:1.

5. Improvement according to claim 1, in which said aqueous salt solution is an aqueous cobalt salt solution containing iron.

References Cited in the file of this patent

UNITED STATES PATENTS

| | | |
|---|---|---|
| 2,697,731 | Nagel | Dec. 21, 1954 |
| 2,750,430 | Hagemann et al. | June 12, 1956 |
| 2,802,843 | Tramm et al. | Aug. 13, 1957 |
| 2,810,680 | Buchner et al. | Oct. 22, 1957 |
| 2,841,618 | Aldridge et al. | July 1, 1958 |

FOREIGN PATENTS

| | | |
|---|---|---|
| 665,705 | Great Britain | Jan. 30, 1952 |

OTHER REFERENCES

Holm et al.: Fiat Final Report No. 1000 (P.B.–81383); pp. 20, 23, 24, 68, 69, 72, December 1947.

Meyer: (Translation): "Oxo Process" (P.B.–71337), Charles A. Meyer & Co., Inc., N.Y. 1948; pp. 10, 11, 35, 36, 37, 68, 69. (Copies of Publ. in Sci. Library.)

UNITED STATES PATENT OFFICE
CERTIFICATE OF CORRECTION

Patent No. 3,095,451                                                    June 25, 1963

Otto Roelen et al.

It is hereby certified that error appears in the above numbered patent requiring correction and that the said Letters Patent should read as corrected below.

Column 1, line 65, for "though" read -- through --; column 2, line 48, for "240-160 kg./sq.cm." read -- 240-260 kg./sq.cm. --; column 3, lines 29 and 30, for "constitutents" read -- constituents --; column 6, line 55, for "was" read -- were --; column 8, line 5, for "compounl" read -- compound --.

Signed and sealed this 14th day of January 1964.

(SEAL)
Attest:

ERNEST W. SWIDER

Attesting Officer

EDWIN L. REYNOLDS

Acting        Commissioner of Patents